United States Patent
Tonishi

(10) Patent No.: US 8,123,847 B2
(45) Date of Patent: Feb. 28, 2012

(54) WATER BASE INK FOR INK-JET RECORDING, INK CARTRIDGE, AND INK-JET RECORDING APPARATUS

(75) Inventor: Hisako Tonishi, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 177 days.

(21) Appl. No.: 12/563,549

(22) Filed: Sep. 21, 2009

(65) Prior Publication Data

US 2010/0079564 A1   Apr. 1, 2010

(30) Foreign Application Priority Data

Sep. 26, 2008   (JP) .................................. 2008-247115

(51) Int. Cl.
*C09D 11/02* (2006.01)

(52) U.S. Cl. ............... 106/31.59; 106/31.58; 106/31.86; 106/31.89

(58) Field of Classification Search ............... 106/31.58, 106/31.86, 31.59, 31.89
See application file for complete search history.

(56) References Cited

U.S. PATENT DOCUMENTS

| | | | |
|---|---|---|---|
| 4,985,077 A | 1/1991 | Ise et al. | |
| 5,609,671 A | 3/1997 | Nagasawa | |
| 5,837,045 A | 11/1998 | Johnson et al. | |
| 6,153,001 A | 11/2000 | Suzuki et al. | |
| 6,409,330 B1 | 6/2002 | Nakamura et al. | |
| 6,867,286 B1 * | 3/2005 | Holloway et al. | 534/797 |
| 2004/0226477 A1 * | 11/2004 | Hoshi et al. | 106/31.86 |
| 2005/0162457 A1 * | 7/2005 | Fukuda et al. | 347/21 |
| 2010/0077937 A1 | 4/2010 | Kawai et al. | |

FOREIGN PATENT DOCUMENTS

| | | |
|---|---|---|
| JP | 01-266173 | 10/1989 |
| JP | 03-014881 | 1/1991 |
| JP | 04-153279 | 5/1992 |
| JP | 08-003498 | 1/1996 |
| JP | 08-067840 | 3/1996 |
| JP | 11-166144 | 6/1999 |
| JP | 11-181341 | 7/1999 |
| JP | 11-256087 | 9/1999 |
| JP | 2000-513396 | 10/2000 |
| JP | 2010-077279 A | 4/2010 |
| WO | 00/04103 | 1/2000 |

OTHER PUBLICATIONS

Corresponding U.S. Appl. No. 12/563,422 filed Sep. 21, 2009.

* cited by examiner

*Primary Examiner* — Jerry Lorengo
*Assistant Examiner* — Veronica F Faison
(74) *Attorney, Agent, or Firm* — Banner & Witcoff, Ltd.

(57) ABSTRACT

The water base ink for ink jet recording of the present invention is a water base ink for ink-jet recording containing a coloring agent, water, a penetrant, and a surfactant; wherein the penetrant includes diethylene glycol n-hexyl ether (A); the surfactant includes at least one surfactant (B) selected from the group consisting of alkyl sulfonate, alkylbenzene sulfonate, alkyl carboxylate, and polyoxyethylene alkyl ether sulfate; a weight ratio (B/A) of (B) with respect to (A) is not less than 0.10; and the (A) is contained in the ink in an amount of 1.0% by weight to 2.5% by weight.

18 Claims, 2 Drawing Sheets

Fig. 3A
Fig. 3B
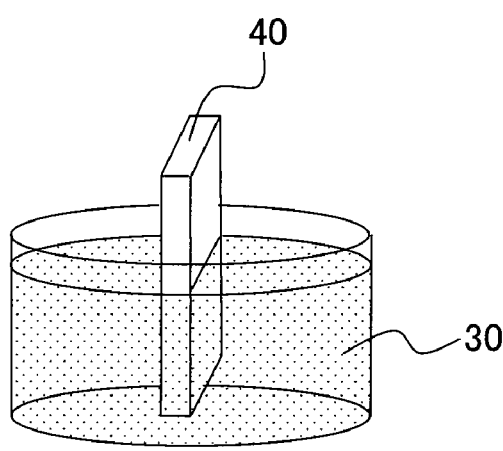
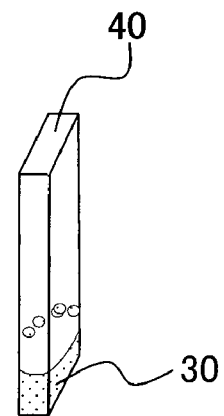

WATER BASE INK FOR INK-JET RECORDING, INK CARTRIDGE, AND INK-JET RECORDING APPARATUS

CROSS REFERENCE TO RELATED APPLICATION

The present application claims priority from Japanese Paten Application No. 2008-247115, filed on Sep. 26, 2008, the disclosure of which is incorporated herein by reference in its entirety.

BACKGROUND OF THE INVENTION

1. Field of the Invention

The present invention relates to a water base ink for ink-jet recording, an ink cartridge, and an ink-jet recording apparatus.

2. Description of the Related Art

In recent years, a high printing speed, which is equivalent to that of a laser printing, is required to be realized in the printing on a plain paper in the field of the ink-jet printing. A method, in which the printing dot number is decreased for the plain paper to enhance the permeability of the ink, is exemplified as a method for achieving the realization of the high printing speed.

The permeability of the ink can be enhanced by adding a penetrant to the ink. For example, an ink has been suggested, in which diethylene glycol n-hexyl ether (DEGHE) is used as the penetrant (Japanese Patent Application Laid-open Nos. 1-266173, 3-14881, 4-153279, 8-67840, 11-166144, 11-256087, and 11-181341 and International Publication No. WO 00/04103).

However, if a large amount of DEGHE is added to the ink, the vaporization characteristic of the ink is deteriorated. For this reason, before the ink is discharged from an ink-jet head, the ink is solidified and/or the coloring agent in the ink precipitates or aggregates, for example, on an ink-discharge surface of the ink-jet head and/or on a wall surface of an ink tank, consequently making the nozzle of the ink-jet head easily clog-up, thus causing the discharge failure or undischarge.

SUMMARY OF THE INVENTION

In view of the above, an object of the present invention is to provide a water base ink for ink-jet recording which is excellent in the permeability and the vaporization characteristic.

According to a first aspect of the present invention, there is provided a water base ink for ink-jet recording containing a coloring agent, water, a penetrant, and a surfactant, wherein the penetrant includes diethylene glycol n-hexyl ether (DEGHE (A)); the surfactant includes at least one surfactant (B) selected from the group consisting of alkyl sulfonate, alkylbenzene sulfonate, alkyl carboxylate, and polyoxyethylene alkyl ether sulfate; and a weight ratio of the surfactant with respect to the diethylene glycol n-hexyl ether (weight ratio (B/A) of (B) with respect to (A)) is not less than 0.10, and a line width of a one-dot line, which is obtained when an amount of one liquid droplet of the ink to be discharged is set to be within a range of 22 pL to 28 pL and the one-dot line is printed on a plain paper sheet, is 115 μm to 135 μm.

According to a second aspect of the present invention, there is provided a water base ink for ink-jet recording containing: a coloring agent; water; diethylene glycol n-hexyl ether; and at least one surfactant selected from the group consisting of alkyl sulfonate, alkylbenzene sulfonate, alkyl carboxylate, and polyoxyethylene alkyl ether sulfate; wherein the diethylene glycol n-hexyl ether is contained in the water base ink in an amount of 1.0% by weight to 2.5% by weight; a weight ratio of the surfactant with respect to the diethylene glycol n-hexyl ether is not less than 0.10.

The inventor of the present application realized that in addition to the problems associated with the conventional technique as described about, there was problems such that (i) since the diethylene glycol n-hexyl ether (DEGHE) exhibits a poor water solubility, a problem arises such that an amount of DEGHE, which is required to obtain the sufficient permeating power, cannot be added into the ink; and (ii) DEGHE has a problem of low water repellence with respect to a wall surface of an ink cartridge, as will be described later on. The inventor found out, through a series of researches performed by the inventor, used DEGHE (A) as the penetrant for the water base ink for ink jet recording, added at least one surfactant (B) included in the four specified surfactants defined above to the ink, and set the weight ratio (B/A) to be not less than 0.10. Accordingly, the solubility of DEGHE (A) was enhanced in the ink and it was possible to achieve the high permeability and the good or satisfactory vaporization characteristic of the ink. Further, the inventor found out that by adjusting the weight ratio (B/A) within a limited range, it was possible to sufficiently obtain the water repellence of the DEGHE with respect to the wall surface of the ink cartridge.

BRIEF DESCRIPTION OF THE DRAWINGS

FIG. 3 (FIGS. 3A and 3B) illustrates a method for evaluating the water repellence as referred to in an embodiment of the present invention.

DESCRIPTION OF THE PREFERRED EMBODIMENTS

Figure 1A:
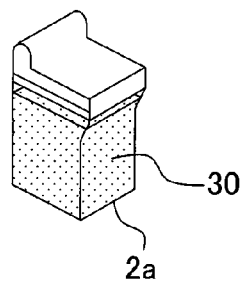
FIG. 1 (FIGS. 1A and 1B) is a perspective view of an exemplary ink cartridge of the present invention.

In the present application, the term "plain paper" or "plain paper sheet" refers to paper or paper sheet in which any special processing or any special coating treatment is not applied to a surface, including, for example, high quality paper to be used for notebooks and report paper sheets and copy paper for which no coating is applied. The plain paper includes, for example, "Laser Print" produced by Hammermill; "DATE COPY Paper" produced by M-real; "4200", "Business", and "Recycled Supreme" produced by XEROX; "4200DP PAPER" produced by Fuji Xerox Office Supply; "My Paper" produced by Ricoh Company, Ltd.; and "Office Paper W" produced by Fujitsu Coworco Ltd. In the present invention, the plain paper is merely used in order to evaluate the permeability of the ink. The recording medium is not limited to the plain paper.

In the present application, the term "water repellence of the ink" means such a property of the ink that the ink is repelled by the wall surface (surface) of the ink cartridge, for example, when the ink is brought in contact with the wall surface of the ink cartridge. As the water repellence is higher, the ink is less likely to adhere to the wall surface of the cartridge. An ink using DEGHE has the low water repellence. Therefore, the inventor realized that such an ink tends to adhere to the wall surface of the ink cartridge, thereby causing such a problem that the residual amount of the ink cannot be confirmed from the outside and such a problem that the ink is wasted. On the other hand, in the ink of the present invention, the inventor found out that in particular by selecting the polyoxyethylene alkyl ether sulfate as (B) and by making the weight ratio (B/A) to be not less than 0.20 as described later on, it was possible to provide excellent water repellence for the ink.

In the water base ink for ink-jet recording of the present invention, it is preferable that a blending amount of DEGHE (A) ((A) ratio) with respect to a total amount of the ink is less than 3% by weight. When the (A) ratio is less than 3% by weight, it is possible to obtain the more preferred vaporization characteristic of the ink. The (A) ratio is more preferably 1% by weight to less than 3% by weight. When the (A) ratio is 1% by weight to less than 3% by weight, it is possible to obtain the more preferred permeability of the ink. The (A) ratio is more preferably 1% by weight to 2.5% by weight.

Next, the water base ink for ink jet recording of the present invention will be explained in detail. The water base ink for ink jet recording of the present invention (hereinafter simply referred to as "ink" in some cases) contains a coloring agent, water, a penetrant, and a surfactant.

The coloring agent is not specifically limited. The coloring agent may be any one of a pigment and a dye. A mixture, which is obtained by mixing the pigment and the dye, may be used as the coloring agent.

The pigment is not limited. Those usable include, for example, carbon black, inorganic pigments, and organic pigments. The carbon black includes, for example, furnace black, lamp black, acetylene black, and channel black. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. The pigments as described above include, for example, C. I. Pigment Blacks 1, 6, and 7; C. I. Pigment Yellows 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may include a self-dispersible pigment. The self-dispersible pigment is dispersible in water without using any dispersing agent, for example, owing to the fact that at least one of the hydrophilic functional group and the salt thereof including, for example, carboxyl group, carbonyl group, hydroxyl group, and sulfon group is introduced into the surfaces of the pigment particles by the chemical bond directly or with any polyvalent group intervening therebetween.

The self-dispersible pigment is not limited. It is possible to use self-dispersible pigments subjected to the surface treatment by any one of methods described, for example, in Japanese Patent Application Laid-open No. 8-3498 and Published Japanese Translation of PCT International Publication for Patent Application No. 2000-513396. For example, any commercially available product may be used for the self-dispersible pigment. The commercially available product includes, for example, "CAB-O-JET (trade name) 200", "CAB-O-JET (trade name) 250", "CAB-O-JET (trade name) 260", "CAB-O-JET (trade name) 270", "CAB-O-JET (trade name) 300", and "CAB-O-JET (trade name) 700" produced by Cabot Specialty Chemicals; "BONJET (trade name) BLACK CW-1", "BONJET (trade name) BLACK CW-2", and "BONJET (trade name) BLACK CW-3" produced by Orient Chemical Industries, Ltd.; and "LIOJET (trade name) WD BLACK 002C" produced by Toyo Ink Mfg. Co., Ltd.

The pigment, which is usable as the raw material for the self-dispersible pigment, is not limited. It is possible to use any one of inorganic pigments and organic pigments. The pigment, which is suitable to perform the surface treatment, includes, for example, carbon blacks such as "MA8" and "MA100" produced by Mitsubishi Chemical Corporation and "Color Black FW200" produced by Degussa.

The blending amount of the pigment (pigment ratio) with respect to the total amount of the ink is not limited, and can be appropriately determined depending on, for example, the desired optical density and the coloration or colorfulness. The pigment ratio is, for example, 0.1% by weight to 20% by weight, preferably 1% by weight to 10% by weight, and more preferably 2% by weight to 8% by weight. One type of the pigment as described above may be used singly, or two or more types of the pigments as described above may be used in combination.

The dye is not limited, and includes, for example, direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black includes, for example, C. I. Direct Blacks 17, 19, 32, 51, 71, 108, 146, 154, and 168. C. I. Direct Blue includes, for example, C. I. Direct Blues 6, 22, 25, 71, 86, 90, 106, and 199. C. I. Direct Red includes, for example, C. I. Direct Reds 1, 4, 17, 28, 83, and 227. C. I. Direct Yellow includes, for example, C. I. Direct Yellows 12, 24, 26, 86, 98, 132, and 142. C. I. Direct Orange includes, for example, C. I. Direct Oranges 34, 39, 44, 46, and 60. C. I. Direct Violet includes, for example, C. I. Direct Violets 47 and 48. C. I. Direct Brown includes, for example, C. I. Direct Brown 109. C. I. Direct Green includes, for example, C. I. Direct Green 59. C. I. Acid Black includes, for example, C. I. Acid Blacks 2, 7, 24, 26, 31, 52, 63, 112, and 118. C. I. Acid Blue includes, for example, C. I. Acid Blues 9, 22, 40, 59, 93, 102, 104, 117, 120, 167, 229, and 234. C. I. Acid Red includes, for example, C. I. Acid Reds 1, 6, 32, 37, 51, 52, 80, 85, 87, 92, 94, 115, 180, 256, 289, 315, and 317. C. I. Acid Yellow includes, for example, C. I. Acid Yellows 11, 17, 23, 25, 29, 42, 61, and 71. C. I. Acid Orange includes, for example, C. I. Acid Oranges 7 and 19. C. I. Acid Violet includes, for example, C. I. Acid Violet 49. C. I. Basic Black includes, for example, C. I. Basic Black 2. C. I. Basic Blue includes, for example, C. I. Basic Blues 1, 3, 5, 7, 9, 24, 25, 26, 28, and 29. C. I. Basic Red includes, for example, C. I. Basic Reds 1, 2, 9, 12, 13, 14, and 37. C. I. Basic Violet includes, for example, C. I. Basic Violets 7, 14, and 27. C. I. Food Black includes, for example, C. I. Food Blacks 1 and 2. The dyes as described above are excellent, for example, in the characteristics such as the vividness, the water solubility, and the stability.

The blending amount of the dye (dye ratio) with respect to the total amount of the ink is not limited, and is, for example, 0.1% by weight to 20% by weight, preferably 1% by weight to 10% by weight, and more preferably 2% by weight to 8% by weight. One type of the dye as described above may be used singly, or two or more types of the dyes as described above may be used in combination.

Water is preferably ion-exchanged water or pure water (purified water). The blending ratio of water (water ratio) with respect to the total amount of the ink is appropriately determined depending on, for example, the desired ink characteristics. The water ratio may be, for example, the balance of the other components.

The penetrant includes diethylene glycol n-hexyl ether (DEGHE: (A)). The penetrant adjusts, for example, the drying speed of the ink on the surface of the recording medium. The blending amount of DEGHE (A) ((A) ratio) is as described above.

The surfactant includes at least one surfactant (B) selected from the group consisting of alkyl sulfonate, alkylbenzene sulfonate, alkyl carboxylate, and polyoxyethylene alkyl ether sulfate.

The alkyl sulfonate is exemplified, for example, by compounds represented by the general formula (1).

$$R^1\text{---}SO_3M^1 \quad (1)$$

In the general formula (1), $R^1$ is a straight chain alkyl group having a number of carbon atoms of 10 to 18, and $M^1$ is sodium ion, potassium ion, ammonium ion, or triethanolamine ion to serve as the counter ion.

In the general formula (1), $R^1$ is preferably a straight chain alkyl group having a number of carbon atoms of 12 to 16, and $M^1$ is preferably sodium ion or potassium ion to serve as the counter ion.

For example, any commercially available product may be used for the alkyl sulfonate. The commercially available product includes, for example, "SUNNOL (trade name) LM-113" produced by Lion Corporation; "EMAL (trade name) O" and "EMAL (trade name) TD" produced by Kao Corporation; and "SANDED (trade name) LMN" produced by Sanyo Chemical Industries, Ltd.

The alkylbenzene sulfonate is exemplified, for example, by compounds represented by the following formula (2).

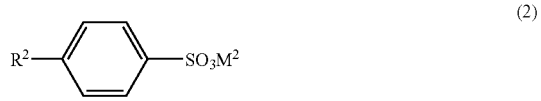

(2)

In the general formula (2), $R^2$ is a straight chain alkyl group having a number of carbon atoms of 10 to 18, and $M^2$ is sodium ion, potassium ion, ammonium ion, or triethanolamine ion to serve as the counter ion.

In the general formula (2), $R^2$ is preferably a straight chain alkyl group having a number of carbon atoms of 12 to 16, and $M^2$ is preferably sodium ion or potassium ion to serve as the counter ion.

For example, any commercially available product may be used for the alkylbenzene sulfonate. The commercially available product includes, for example, "NEOPELEX (trade name) G-25" produced by Kao Corporation; "LIPON (trade name) LH-200" produced by Lion Corporation; "RUNOX (trade name) S-100" produced by Toho Chemical Industry Co., Ltd.; and "Newcol (trade name) 220L (65)" produced by Nippon Nyukazai Co., Ltd.

The alkyl carboxylate is exemplified, for example, by compounds represented by the following formula (3).

$$R^3\text{---}COOM^3 \quad (3)$$

In the general formula (3), $R^3$ is a straight chain alkyl group having a number of carbon atoms of 10 to 18, and $M^3$ is sodium ion, potassium ion, ammonium ion, or triethanolamine ion to serve as the counter ion.

In the general formula (3), $R^3$ is preferably a straight chain alkyl group having a number of carbon atoms of 12 to 16, and $M^3$ is preferably sodium ion or potassium ion to serve as the counter ion.

For example, any commercially available product may be used for the alkyl carboxylate. The commercially available product includes, for example, "FR-15", "FR-25", "Flake Marcel (trade name)" series, and "KS SOAP" produced by Kao Corporation.

The polyoxyethylene alkyl ether sulfate is exemplified, for example, by compounds represented by the general formula (4).

$$R^4\text{---}O(CH_2CH_2O)_x\text{---}SO_3M^4 \quad (4)$$

In the general formula (4), $R^4$ is a straight chain alkyl group having a number of carbon atoms of 10 to 18, x is 1 to 4, and $M^4$ is sodium ion, potassium ion, ammonium ion, or triethanolamine ion to serve as the counter ion.

In the general formula (4), $R^4$ is preferably a straight chain alkyl group having a number of carbon atoms of 12 to 16, x is preferably 1 to 3, and $M^4$ is preferably sodium ion or potassium ion to serve as the counter ion. In particular, when $M^4$ is sodium ion as the counter ion, it is possible to obtain the ink which is more excellent in the water repellence.

For example, any commercially available product may be used for the polyoxyethylene alkyl ether sulfate. The commercially available product includes, for example, "BEAULIGHT (trade name) NA-25S" and "SANDED (trade name) EN" produced by Sanyo Chemical Industries, Ltd.; "EMAL (trade name) 327" and "EMAL (trade name) 20C" produced by Kao Corporation; and "SUNNOL (trade name) NL-1430" produced by Lion Corporation.

The water base ink for ink jet recording of the present invention may contain any surfactant, other than alkyl sulfonate, alkylbenzene sulfonate, alkyl carboxylate, and polyoxyethylene alkyl ether sulfate, within a range in which the effect of the present invention is not deteriorated. Only one type of the other surfactant may be used, or two or more types of the other surfactants may be used.

The water base ink for ink jet recording of the present invention preferably further contains a moistening agent. The moistening agent prevents, for example, the ink from being dried at an end portion (forward end portion) of the ink jet head.

The moistening agent is not limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketone alcohols such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylenes glycol, diethylene glycol, triethylene glycol, dipropylene glycol, tripropylene glycol, thiodiglycol, and hexylene glycol. In particular, it is preferable to use polyvalent alcohols such as alkylene glycol and glycerol. One type of the moistening agent as described above may be used singly, or two or more types of the moistening agents as described above may be used in combination.

The blending ratio (moistening agent ratio) of the moistening agent with respect to the total amount of the ink is not limited. The blending ratio (moistening agent ratio) is, for example, 0% by weight to 95% by weight, preferably 10% by weight to 80% by weight, and more preferably 10% by weight to 50% by weight.

The water base ink for ink jet recording of the present invention may further contain a conventionally known additive, if necessary. The additive includes, for example, viscosity-adjusting agents, surface tension-adjusting agents, and fungicides. The viscosity-adjusting agent is not limited, and includes, for example, polyvinyl alcohol, cellulose, and water-soluble resin.

The water base ink for ink-jet recording of the present invention can be prepared, for example, such that the coloring agent, water, the penetrant, the surfactant, and optionally other additive component(s) are mixed uniformly or homogeneously by any conventionally known method, and undissolved matters are removed by a filter or the like.

As described above, DEGHE (A) is used as the penetrant in the water base ink for ink jet recording of the present Invention. Further, the water base ink for ink jet recording of the present invention contains at least one surfactant (B) of the four specified surfactants as defined above, and the weight ratio (B/A) is not less than 0.10. Accordingly, the high permeability is achieved by the water base ink for ink jet recording of the present invention such that the line width of the one-dot line is 115 μm to 135 μm when the one-dot line is printed on the plain paper while the amount of one liquid droplet of the ink to be discharged from the nozzle of the ink-jet head is set to be within the range of 22 pL to 28 pL. Further, the water base ink for ink jet recording of the present invention is excellent in the vaporization characteristic as described above. The upper limit value of the weight ratio (B/A) is not specifically limited. However, the upper limit value of the weight ratio (B/A) is, for example, 1.

Next, the ink cartridge of the present invention will be explained. As described above, the ink cartridge of the present invention is an ink cartridge containing a water base ink for ink jet recording, wherein the ink is the water base ink for ink jet recording of the present invention. For example, any conventionally known member can be used as the body (main body) of the ink cartridge of the present invention.

Figure 1B:
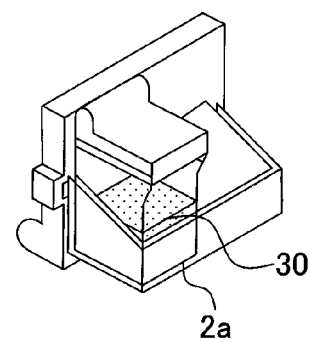

FIG. 1 (FIGS. 1A and 1B) shows an example of the ink cartridge of the present invention. The ink cartridge of this embodiment is filled with the water base ink for ink jet recording of the present invention in which the surfactant (B) is the polyoxyethylene alkyl ether sulfate, and the weight ratio (B/A) is not less than 0.20. FIG. 1A shows an ink cartridge 2a before the start of the use (before being provided on an ink jet recording apparatus), and FIG. 1B shows the ink cartridge 2a during the use as being provided on a carriage 5 of the ink-jet recording apparatus. As shown in FIG. 1, the ink cartridge 2a of the present invention is filled with the water base ink for ink-jet recording of the present invention which is excellent in the water repellence. Therefore, the ink 30 hardly adheres to the wall surface of the ink cartridge 2a. It is easy to confirm the residual amount of the ink from the outside, and the ink is not wasted.

Preferably, the ink cartridge is formed of a resin including, for example, polypropylene (PP), polyethylene (PE), ABS resin, AES resin, and polystyrene (PS). Especially preferably, the ink cartridge is formed of polypropylene (PP).

Next, the ink-jet recording apparatus of the present invention will be explained. The ink jet recording apparatus of the present invention is an ink-jet recording apparatus including an ink cartridge and an ink discharge head, and discharging an ink contained in the ink cartridge from the ink discharge head, wherein the ink cartridge is the ink cartridge of the present invention. Except for this feature, the construction of the ink-jet recording apparatus of the present invention may be the same as or equivalent to the construction of, for example, any conventionally known ink-jet recording apparatus.

Figure 2:
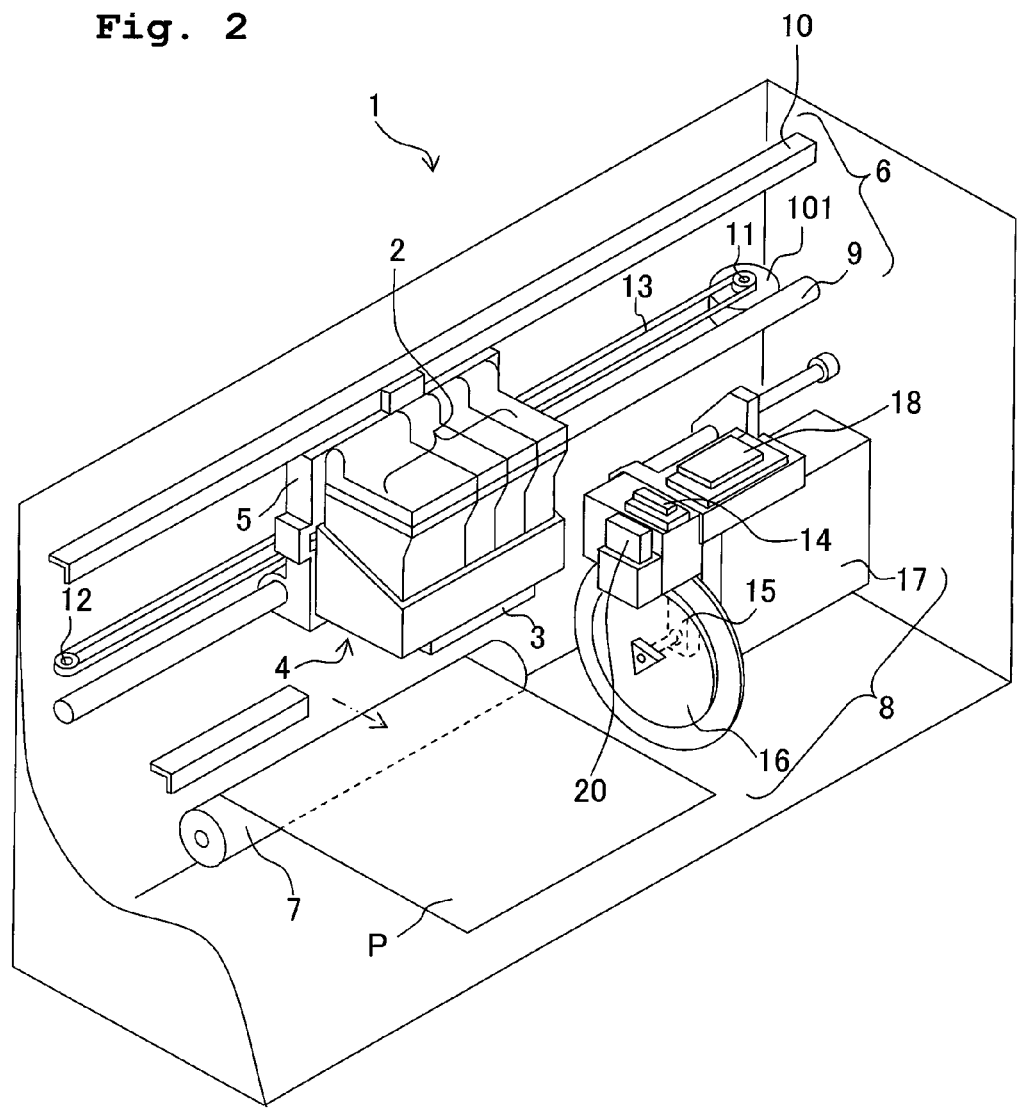
FIG. 2 is a schematic perspective view of an exemplary construction of an ink jet recording apparatus of the present invention.

FIG. 2 shows an exemplary construction of the ink jet recording apparatus of the present invention by way of example. As shown in FIG. 2, the ink-jet recording apparatus 1 includes, as main constitutive members, four ink cartridges 2, an ink jet head 3, a head unit 4, a carriage 5, a driving unit 6, a platen roller 7, and a purge unit 8.

Each of the four ink cartridges 2 contains each one of the inks of four colors of yellow, magenta, cyan, and black. For example, the four ink cartridges 2 are the ink cartridges of the present invention. The ink jet head 3 performs the printing on a recording medium P such as the recording paper. The head unit 4 is provided with the ink jet head 3. The four ink cartridges 2 and the head unit 4 are provided on the carriage 5. The driving unit 6 reciprocatively moves the carriage 5 in a linear direction. The platen roller 7 extends in the reciprocating direction of the carriage 5, and the platen roller 7 is arranged to be opposite or to face the ink-jet head 3.

The driving unit 6 includes a carriage shaft 9, a guide plate 10, two pulleys 11, 12, and an endless belt 13. The carriage shaft 9 is arranged at a lower end portion of the carriage 5, and the carriage shaft 9 extends in parallel to the platen roller 7. The guide plate 10 is arranged at an upper end portion of the carriage 5, and the guide plate 10 extends in parallel to the carriage shaft 9. The two pulleys 11, 12 are arranged at both end portions of the carriage shaft 9 and between the carriage shaft 9 and the guide plate 10. The endless belt 13 is allowed to travel between the two pulleys 11, 12.

In the ink jet recording apparatus 1, when the pulley 11 is rotated positively or reversely by the driving of a carriage motor 101, the carriage 5, which is joined to the endless belt 13, is reciprocatively moved in the linear direction along the carriage shaft 9 and the guide plate 10 in accordance with the positive or reverse rotation of the pulley 11.

The recording medium P is fed from a paper feed cassette (not shown) provided at a side portion or a lower portion of the ink jet recording apparatus 1. The recording mechanism P is introduced into a space between the ink-jet head 3 and the platen roller 7. Accordingly, a predetermined printing is performed with the inks discharged from the ink jet head 3 on the recording medium P. The recording medium P is then discharged from the ink-jet recording apparatus 1. In FIG. 2, a paper feed mechanism and a paper discharge mechanism for the recording medium P are omitted from the illustration.

The purge unit 8 is provided on the side of the platen roller 7. The purge unit 8 is arranged so that the purge unit 8 is opposite to or facing the ink-jet head 3 when the head unit 4 is at a reset position (located over or above the purge unit 8 in this embodiment). The purge unit 8 includes a purge cap 14, a pump 15, a cam 16, and an ink storage section 17. The purge cap 14 covers a plurality of nozzles (not shown) of the ink-jet head 3 when the head unit 4 is at the reset position. The pump 15 sucks any defective ink containing bubbles or the like stored or accumulated in the ink-jet head 3, in accordance with the driving of the cam 16. Accordingly, the ink-jet head 3 is restored. The sucked defective ink is stored in the ink storage section 17.

A wiper member 20 is arranged in the purge unit 8 at a position of the purge unit 8 on the side of the platen roller 7 such that the wiper member 20 is adjacent to the purge unit 8. The wiper member 20 is formed to have a spatula-shaped form. The wiper member 20 performs wiping for a nozzle-formed surface of the ink jet head 3 in accordance with the movement of the carriage 5. With reference to FIG. 2, the cap 18 covers the plurality of nozzles of the ink-jet head 3 which is returned to the reset position when the printing is completed, in order to prevent the ink from being dried.

In the case of the ink-jet recording apparatus 1 of this embodiment, the four ink cartridges 2 are provided on one carriage 5. However, the present invention is not limited to this. In the ink jet recording apparatus of the present invention, the four ink cartridges may be provided on a plurality of carriages. The ink cartridges may be arranged and fixed in the ink jet recording apparatus, rather than being provided on the carriage. In such an aspect, for example, the ink cartridges are connected to the head unit provided on the carriage, for example, by tubes, and the inks are supplied from the ink cartridges to the head unit.

The ink-jet recording apparatus of the present invention may be the serial type ink-jet recording apparatus shown in FIG. 2, or the ink-jet recording apparatus of the present invention may be a line type ink-jet recording apparatus. The line type ink jet recording apparatus includes a line type ink-jet head which has a printing width of not less than a width of the recording medium such as the recording paper. The ink jet recording apparatus is capable of collectively performing the printing in the widthwise direction on the recording medium in a state that the ink-jet head is fixed. On the other hand, as shown in FIG. 2, the serial type ink-jet recording apparatus performs the printing while allowing the ink-jet head itself to move in the widthwise direction on the surface of the recording medium. The line type ink jet recording apparatus has a wide printing width in which the printing can be performed simultaneously. Therefore, the printing speed is extremely fast as compared with the serial type ink-jet recording apparatus. The water base ink for ink-jet recording and the ink cartridge of the present invention are excellent in the permeability of the ink. Therefore, by using the water base ink for ink jet recording and the ink cartridge of the present invention for the line type ink-jet recording apparatus, it is possible to realize the efficient ink-jet recording.

EXAMPLES

Next, Examples of the present invention will be explained together with Comparative Examples. The present invention is neither limited to nor restricted by Examples and Comparative Examples described below at all.

Examples 1 to 18 and Comparative Examples 1 to 21

As for Examples 1 to 12, Examples 16 to 18, Comparative Example 1, and Comparative Examples 5 to 21, components except for "CAB-O-JET (trade name) 300", which were included in ink composition components (Tables 1 and 2), were mixed uniformly or homogeneously to obtain ink solvents. Subsequently, the ink solvents were gradually added to "CAB-O-JET (trade name) 300", followed by being mixed uniformly. After that, obtained mixtures were filtrated through a cellulose acetate membrane filter (pore size 3.00 μm) produced by Toyo Roshi Kaisha, Ltd., and thus inks were obtained. Inks of Examples 13 to 15 and Comparative Examples 2 to 4, in which "CAB-O-JET (trade name) 300" was not used, were prepared such that all components were mixed uniformly, and then obtained mixtures were filtrated through a membrane filter (pore size 0.20 μm) of made of hydrophilic polytetrafluoroethylene (PTFE) produced by Toyo Roshi Kaisha, Ltd.

The inks of Examples and Comparative Examples were subjected to (a) permeability evaluation, (b) solubility evaluation for DEGHE (A), (c) water repellence evaluation, (d) vaporization characteristic evaluation, and (e) overall evaluation in accordance with the following methods.

(a) Permeability Evaluation

One-dot line was printed at a resolution of 600 dpi on a plain paper sheet by using each of the inks of Examples and Comparative Examples, while setting the amount of one liquid droplet to be within a range of 22 pL to 28 pL by using a digital multifunction machine DCP-350C provided with an ink-jet printer produced by Brother Industries, Ltd. The line width of the one-dot line was measured by Personal IAS produced by QEA, and the evaluation was made in accordance with the following evaluation criterion. The evaluation was made by using five type of paper sheets, i.e., "Business" produced by XEROX, "Recycled Supreme" produced by XEROX, "My Paper" produced by Ricoh Company, Ltd., "Office Paper W" produced by Fujitsu Coworco Ltd., and "Laser Print" produced by Hammermill as the plain paper sheets described above. The same or equivalent evaluation result was obtained even when any one of the plain paper sheets was used.

Evaluation Criterion for Permeability Evaluation
 A: Line width was 115 μm to 135 μm.
 C (1): Line width was less than 115 μm.
 C (2): Line width was above 135 μm.

(b) Solubility Evaluation for DEGHE

Solutions, from which coloring agent components (pigment solid contents or dyes) of Examples and Comparative Examples were removed, were prepared. 20 g of each of the solutions was introduced into a vial made of glass, and the vial was hermetically sealed. After that, the vial was stationarily placed in a thermostatic chamber for 3 hours under a condition of 60° C. Subsequently, the solution was agitated or stirred immediately after being taken out of the thermostatic chamber. The transparency of the solution was visually observed, and the evaluation was made in accordance with the following evaluation criterion.

Evaluation Criterion for Solubility Evaluation for DEGHE
 A: Solution was colorless and transparent.
 C: Solution was cloudy or turbid in white color.

(c) Water Repellence Evaluation

As shown in FIG. 3A, test pieces 40 (height 70 mm×width 15 mm×thickness 4 mm) of five kinds of PP, PE, ABS resin, AES resin, and PS were each immersed in the ink 30 of each of Examples and Comparative Examples to such an extent that about a half of the total volume was immersed. Subsequently, 20 seconds were allowed to elapse in an upstanding state after taking out the test piece 40 from the ink 30, and then the amount of the ink 30 (adhering ink amount) adhered to the surface of the immersed portion of the test piece 40 was visually observed as shown in FIG. 3B. The evaluation was made in accordance with the following evaluation criterion.

Evaluation Criterion for Water Repellence Evaluation
 S: Adhering ink amount was not more than 30% of the surface area of the immersed portion of the test piece.
 A: Adhering ink amount was above 30% and less than 80% of the surface area of the immersed portion of the test piece.
 B: Adhering ink amount was not less than 80% of the surface area of the immersed portion of the test piece.

(d) Vaporization Characteristic Evaluation 5 g of the ink of each of Examples and Comparative Examples was poured into an open vial made of glass (diameter: 20.2 mm). The open vial was stored in a thermostatic chamber at a temperature of 60° C. and a relative humidity of 40% until the weight change, which was measured at every 24 hours, was not more than ±0.01 g as compared with a result obtained 24 hours ago. After the storage, the state of the ink in the open vial was visually observed, and the evaluation was made in accordance with the following evaluation criterion.

Evaluation Criterion for Vaporization Characteristic Evaluation

A: Ink flowed or moved when the open vial was inclined or vibrated.

C: Ink did not flow or move even when the open vial was inclined or vibrated.

(e) Overall Evaluation

The overall evaluation was performed in accordance with the following evaluation criterion based on the results of (a) to (d) described above for the inks of Examples and Comparative Examples.

Evaluation Criterion for Overall Evaluation

S: Water repellence evaluation was S, and all of the other evaluation results were A.

A: All of the evaluation results were A.

B: Any one of the evaluation results was B, but C was absent.

C: Any one of the evaluation results was C.

Ink compositions and evaluation results of Examples are shown in Table 1. Ink compositions and evaluation results of Comparative Examples are shown in Table 2. Regarding the water repellency evaluation, the results were same both in Examples and Comparative Examples for the test pieces made of the five materials of PP, PE, ABS resin, AES resin and PS. Accordingly, the results regarding the test pieces made of PP are representatively indicated in Tables 1 and 2.

Note that in Tables 1 and 2:

*1: Self-dispersible black pigment, produced by Cabot Specialty Chemicals, pigment solid content=15% by weight (parenthesized numerals indicate pigment solid content amounts).

*2: Sodium polyoxyethylene (2.5 E.O.) lauryl ether sulfate, produced by Sanyo Chemical Industries, Ltd., active ingredient amount=25% by weight.

*3: Sodium polyoxyethylene (3 E.O.) lauryl ether sulfate, produced by Kao Corporation, active ingredient amount=27% by weight.

*4: Sodium lauryl sulfonate, produced by Kao Corporation, active ingredient amount=100% by weight.

*5: Sodium lauryl sulfonate, produced by Lion Corporation, active ingredient amount=33% by weight.

*6: Sodium dodecylbenzene sulfonate, produced by Kao Corporation, active ingredient amount=25% by weight.

*7: Sodium straight chain alkyl(C: 10-14)benzene sulfonate, produced by Lion Corporation, active ingredient amount=96% by weight.

*8: Potassium oleate soap, produced by Kao Corporation, active ingredient amount=20% by weight.

*9: Potassium castor oil soap, produced by Kao Corporation, active ingredient amount=33% by weight.

*: Parenthesized numerals indicate active ingredient amounts in the surfactant ink composition.

TABLE 1

| | | | Example | | | | | |
|---|---|---|---|---|---|---|---|---|
| | | | 1 | 2 | 3 | 4 | 5 | 6 |
| Ink composition (% by weight) | CAB-O-JET (trade name) 300 (*1) | | 33.3 (5.0) | 33.3 (5.0) | 33.3 (5.0) | 33.3 (5.0) | 33.3 (5.0) | 33.3 (5.0) |
| | C.I. Direct Yellow 132 | | — | — | — | — | — | — |
| | C.I. Acid Red 52 | | — | — | — | — | — | — |
| | C.I. Direct Blue 199 | | — | — | — | — | — | — |
| | Glycerol | | 17.0 | 17.0 | 17.0 | 17.0 | 17.0 | 17.0 |
| | Diethylene glycol | | 5.0 | 5.0 | 5.0 | 5.0 | 5.0 | 5.0 |
| | (A) Surfactant | Diethylene glycol n-hexyl ether | 1.0 | 1.0 | 1.0 | 1.0 | 1.0 | 1.0 |
| | (B) | BEAULIGHT (trade name) NA-25S (*2) | — | — | — | — | — | — |
| | | EMAL (trade name) 327 (*3) | — | — | — | — | — | — |
| | | EMAL (trade name) 0 (*4) | 0.1 (0.1) | — | — | — | — | — |
| | | SUNNOL (trade name) LM-1130 (*5) | — | 0.3 (0.1) | — | — | — | — |
| | | NEOPELEX (trade name) G-25 (*6) | — | — | 0.4 (0.1) | — | — | — |
| | | LIPON (trade name) LH-200 (*7) | — | — | — | 0.1 (0.1) | — | — |
| | | FR-15 (*8) | — | — | — | — | 0.5 (0.1) | — |
| | | FR-25 (*9) | — | — | — | — | — | 0.3 (0.1) |
| | | Active ingredient amount | 0.10 | 0.10 | 0.10 | 0.10 | 0.10 | 0.10 |
| | Water | | balance | balance | balance | balance | balance | balance |
| Evaluation | Permeability evaluation | | A | A | A | A | A | A |
| | B/A | | 0.10 | 0.10 | 0.10 | 0.10 | 0.10 | 0.10 |
| | Solubility evaluation for DEGHE | | A | A | A | A | A | A |
| | Water repellence evaluation | | B | B | B | B | B | B |
| | Vaporization characteristic evaluation | | A | A | A | A | A | A |
| Overall evaluation | | | B | B | B | B | B | B |

| | | | Example | | | | | |
|---|---|---|---|---|---|---|---|---|
| | | | 7 | 8 | 9 | 10 | 11 | 12 |
| Ink composition (% by weight) | CAB-O-JET (trade name) 300 (*1) | | 33.3 (5.0) | 33.3 (5.0) | 33.3 (5.0) | 33.3 (5.0) | 33.3 (5.0) | 33.3 (5.0) |
| | C.I. Direct Yellow 132 | | — | — | — | — | — | — |
| | C.I. Acid Red 52 | | — | — | — | — | — | — |
| | C.I. Direct Blue 199 | | — | — | — | — | — | — |
| | Glycerol | | 17.0 | 17.0 | 17.0 | 17.0 | 17.0 | 17.0 |

TABLE 1-continued

|   |   |   | | | | | | |
|---|---|---|---|---|---|---|---|---|
| | | Diethylene glycol | 5.0 | 5.0 | 5.0 | 5.0 | 5.0 | 5.0 |
| | (A) | Diethylene glycol n-hexyl ether | 1.0 | 1.0 | 1.0 | 1.0 | 1.0 | 1.0 |
| | Surfactant (B) | BEAULIGHT (trade name) NA-25S (*2) | 0.4 (0.1) | — | — | 0.8 (0.2) | 1.0 (0.25) | — |
| | | EMAL (trade name) 327 (*3) | — | — | — | — | — | 0.93 (0.25) |
| | | EMAL (trade name) 0 (*4) | 0.1 (0.1) | — | 0.1 (0.1) | — | — | — |
| | | SUNNOL (trade name) LM-1130 (*5) | — | — | — | — | — | — |
| | | NEOPELEX (trade name) G-25 (*6) | — | 0.4 (0.1) | 0.4 (0.1) | — | — | — |
| | | LIPON (trade name) LH-200 (*7) | — | — | — | — | — | — |
| | | FR-15 (*8) | — | 0.5 (0.1) | — | — | — | — |
| | | FR-25 (*9) | — | — | — | — | — | — |
| | | Active ingredient amount | 0.20 | 0.20 | 0.20 | 0.20 | 0.25 | 0.25 |
| | Water | | balance | balance | balance | balance | balance | balance |
| Evaluation | Permeability evaluation | | A | A | A | A | A | A |
| | B/A | | 0.20 | 0.20 | 0.20 | 0.20 | 0.25 | 0.25 |
| | Solubility evaluation for DEGHE | | A | A | A | A | A | A |
| | Water repellence evaluation | | B | B | B | A | S | S |
| | Vaporization characteristic evaluation | | A | A | A | A | A | A |
| Overall evaluation | | | B | B | B | A | S | S |

| | | | Example | | | | | |
|---|---|---|---|---|---|---|---|---|
| | | | 13 | 14 | 15 | 16 | 17 | 18 |
| Ink composition (% by weight) | | CAB-O-JET (trade name) 300 (*1) | — | — | — | 33.3 (5.0) | 33.3 (5.0) | 33.3 (5.0) |
| | | C.I. Direct Yellow 132 | 5.0 | — | — | — | — | — |
| | | C.I. Acid Red 52 | — | 5.0 | — | — | — | — |
| | | C.I. Direct Blue 199 | — | — | 5.0 | — | — | — |
| | | Glycerol | 17.0 | 17.0 | 17.0 | 17.0 | 17.0 | 17.0 |
| | | Diethylene glycol | 5.0 | 5.0 | 5.0 | 5.0 | 5.0 | 5.0 |
| | (A) | Diethylene glycol n-hexyl ether | 1.0 | 1.0 | 1.0 | 2.0 | 2.5 | 1.5 |
| | Surfactant (B) | BEAULIGHT (trade name) NA-25S (*2) | 1.0 (0.25) | 1.0 (0.25) | 1.0 (0.25) | 2.0 (0.5) | 3.0 (0.75) | 3.0 (0.75) |
| | | EMAL (trade name) 327 (*3) | — | — | — | — | — | — |
| | | EMAL (trade name) 0 (*4) | — | — | — | — | — | — |
| | | SUNNOL (trade name) LM-1130 (*5) | — | — | — | — | — | — |
| | | NEOPELEX (trade name) G-25 (*6) | — | — | — | — | — | — |
| | | LIPON (trade name) LH-200 (*7) | — | — | — | — | — | — |
| | | FR-15 (*8) | — | — | — | — | — | — |
| | | FR-25 (*9) | — | — | — | — | — | — |
| | | Active ingredient amount | 0.25 | 0.25 | 0.25 | 0.50 | 0.75 | 0.75 |
| | Water | | balance | balance | balance | balance | balance | balance |
| Evaluation | Permeability evaluation | | A | A | A | A | A | A |
| | B/A | | 0.25 | 0.25 | 0.25 | 0.25 | 0.30 | 0.50 |
| | Solubility evaluation for DEGHE | | A | A | A | A | A | A |
| | Water repellence evaluation | | S | S | S | S | S | S |
| | Vaporization characteristic evaluation | | A | A | A | A | A | A |
| Overall evaluation | | | S | S | S | S | S | S |

TABLE 2

| | | | Comparative Example | | | | | |
|---|---|---|---|---|---|---|---|---|
| | | | 1 | 2 | 3 | 4 | 5 | 6 |
| Ink composition (% by weight) | | CAB-O-JET (trade name) 300 (*1) | 33.3 (5.0) | — | — | — | 33.3 (5.0) | 33.3 (5.0) |
| | | C.I. Direct Yellow 132 | — | 5.0 | — | — | — | — |
| | | C.I. Acid Red 52 | — | — | 5.0 | — | — | — |
| | | C.I. Direct Blue 199 | — | — | — | 5.0 | — | — |
| | | Glycerol | 17.0 | 17.0 | 17.0 | 17.0 | 17.0 | 11.0 |
| | | Diethylene glycol | 5.0 | 5.0 | 5.0 | 5.0 | 5.0 | 5.0 |
| | | Triethylene glycol n-butyl ether | — | — | — | — | — | — |
| | | Dipropylene glycol n-propyl ether | — | — | — | — | — | — |
| | (A) | Diethylene glycol n-hexyl ether | 0.5 | 0.5 | 0.5 | 0.5 | 0.5 | 5.0 |
| | Surfactant (B) | BEAULIGHT (trade name) NA-25S (*2) | 0.4 (0.1) | 0.4 (0.1) | 0.4 (0.1) | 0.4 (0.1) | 2.0 (0.5) | 4.0 (1.0) |
| | | EMAL (trade name) 327 (*3) | — | — | — | — | — | — |
| | | EMAL (trade name) 0 (*4) | — | — | — | — | — | — |
| | | SUNNOL (trade name) LM-1130 (*5) | — | — | — | — | — | — |

TABLE 2-continued

|  |  |  |  |  |  |  |  |
|---|---|---|---|---|---|---|---|
|  |  | NEOPELEX (trade name) G-25 (*6) | — | — | — | — | — | — |
|  |  | LIPON (trade name) LH-200 (*7) | — | — | — | — | — | — |
|  |  | FR-15 (*8) | — | — | — | — | — | — |
|  |  | FR-25 (*9) | — | — | — | — | — | — |
|  |  | Active ingredient amount | 0.10 | 0.10 | 0.10 | 0.10 | 0.50 | 1.00 |
|  | Water |  | balance | balance | balance | balance | balance | balance |
| Evaluation | Permeability evaluation |  | C(1) | C(1) | C(1) | C(1) | C(1) | C(2) |
|  | B/A |  | 0.20 | 0.20 | 0.20 | 0.20 | 1.00 | 0.20 |
|  | Solubility evaluation for DEGHE |  | A | A | A | A | A | A |
|  | Water repellence evaluation |  | B | B | B | B | S | S |
|  | Vaporization characteristic evaluation |  | A | A | A | A | A | C |
| Overall evaluation |  |  | C | C | C | C | C | C |

|  |  |  | Comparative Example |  |  |  |  |  |
|---|---|---|---|---|---|---|---|---|
|  |  |  | 7 | 8 | 9 | 10 | 11 | 12 |
| Ink composition (% by weight) | CAB-O-JET (trade name) 300 (*1) |  | 33.3 (5.0) | 33.3 (5.0) | 33.3 (5.0) | 33.3 (5.0) | 33.3 (5.0) | 33.3 (5.0) |
|  | C.I. Direct Yellow 132 |  | — | — | — | — | — | — |
|  | C.I. Acid Red 52 |  | — | — | — | — | — | — |
|  | C.I. Direct Blue 199 |  | — | — | — | — | — | — |
|  | Glycerol |  | 17.0 | 17.0 | 17.0 | 17.0 | 17.0 | 17.0 |
|  | Diethylene glycol |  | 5.0 | 5.0 | 5.0 | 5.0 | 5.0 | 5.0 |
|  | Triethylene glycol n-butyl ether |  | — | — | — | — | — | — |
|  | Dipropylene glycol n-propyl ether |  | — | — | — | — | — | — |
|  | (A) | Diethylene glycol n-hexyl ether | 1.0 | 1.0 | 1.0 | 1.0 | 1.0 | 1.0 |
|  | Surfactant (B) | BEAULIGHT (trade name) NA-25S (*2) | 0.2 (0.05) | — | — | — | — | — |
|  |  | EMAL (trade name) 327 (*3) | — | 0.18 (0.05) | — | — | — | — |
|  |  | EMAL (trade name) 0 (*4) | — | — | 0.05 (0.05) | — | — | — |
|  |  | SUNNOL (trade name) LM-1130 (*5) | — | — | — | 0.15 (0.05) | — | — |
|  |  | NEOPELEX (trade name) G-25 (*6) | — | — | — | — | 0.2 (0.05) | — |
|  |  | LIPON (trade name) LH-200 (*7) | — | — | — | — | — | 0.05 (0.05) |
|  |  | FR-15 (*8) | — | — | — | — | — | — |
|  |  | FR-25 (*9) | — | — | — | — | — | — |
|  |  | Active ingredient amount | 0.05 | 0.05 | 0.05 | 0.05 | 0.05 | 0.05 |
|  | Water |  | balance | balance | balance | balance | balance | balance |
| Evaluation | Permeability evaluation |  | A | A | A | A | A | A |
|  | B/A |  | 0.05 | 0.05 | 0.05 | 0.05 | 0.05 | 0.05 |
|  | Solubility evaluation for DEGHE |  | C | C | C | C | C | C |
|  | Water repellence evaluation |  | B | B | B | B | B | B |
|  | Vaporization characteristic evaluation |  | A | A | A | A | A | A |
| Overall evaluation |  |  | C | C | C | C | C | C |

|  |  |  | Comparative Example |  |  |  |  |  |
|---|---|---|---|---|---|---|---|---|
|  |  |  | 13 | 14 | 15 | 16 | 17 | 18 |
| Ink composition (% by weight) | CAB-O-JET (trade name) 300 (*1) |  | 33.3 (5.0) | 33.3 (5.0) | 33.3 (5.0) | 33.3 (5.0) | 33.3 (5.0) | 33.3 (5.0) |
|  | C.I. Direct Yellow 132 |  | — | — | — | — | — | — |
|  | C.I. Acid Red 52 |  | — | — | — | — | — | — |
|  | C.I. Direct Blue 199 |  | — | — | — | — | — | — |
|  | Glycerol |  | 17.0 | 17.0 | 17.0 | 17.0 | 17.0 | 11.0 |
|  | Diethylene glycol |  | 5.0 | 5.0 | 5.0 | 5.0 | 5.0 | 5.0 |
|  | Triethylene glycol n-butyl ether |  | — | — | — | — | — | 6.0 |
|  | Dipropylene glycol n-propyl ether |  | — | — | — | — | — | — |
|  | (A) | Diethylene glycol n-hexyl ether | 1.0 | 1.0 | 1.0 | 1.0 | 1.0 | — |
|  | Surfactant (B) | BEAULIGHT (trade name) NA-25S (*2) | — | — | — | — | 0.1 (0.03) | 2.0 (0.5) |
|  |  | EMAL (trade name) 327 (*3) | — | — | — | — | — | — |
|  |  | EMAL (trade name) 0 (*4) | — | — | — | — | — | — |
|  |  | SUNNOL (trade name) LM-1130 (*5) | — | — | — | 0.08 (0.03) | 0.08 (0.03) | — |
|  |  | NEOPELEX (trade name) G-25 (*6) | — | — | 0.1 (0.03) | 0.1 (0.03) | — | — |
|  |  | LIPON (trade name) LH-200 (*7) | — | — | — | — | — | — |
|  |  | FR-15 (*8) | 0.25 (0.05) | — | 0.12 (0.02) | — | — | — |
|  |  | FR-25 (*9) | — | 0.15 (0.05) | — | — | — | — |
|  |  | Active ingredient amount | 0.05 | 0.05 | 0.05 | 0.06 | 0.06 | 0.50 |
|  | Water |  | balance | balance | balance | balance | balance | balance |

TABLE 2-continued

| Evaluation | Permeability evaluation | A | A | A | A | A | A |
|---|---|---|---|---|---|---|---|
| | B/A | 0.05 | 0.05 | 0.05 | 0.06 | 0.06 | — |
| | Solubility evaluation for DEGHE | C | C | C | C | C | A |
| | Water repellence evaluation | B | B | B | B | B | S |
| | Vaporization characteristic evaluation | A | A | A | A | A | C |
| Overall evaluation | | C | C | C | C | C | C |

|  |  | Comparative Example | | |
|---|---|---|---|---|
|  |  | 19 | 20 | 21 |
| Ink composition (% by weight) | CAB-O-JET (trade name) 300 (*1) | 33.3 (5.0) | 33.3 (5.0) | 33.3 (5.0) |
| | C.I. Direct Yellow 132 | — | — | — |
| | C.I. Acid Red 52 | — | — | — |
| | C.I. Direct Blue 199 | — | — | — |
| | Glycerol | 13.0 | 15.0 | 16.0 |
| | Diethylene glycol | 5.0 | 5.0 | 5.0 |
| | Triethylene glycol n-butyl ether | — | 3.0 | — |
| | Dipropylene glycol n-propyl ether | 4.0 | — | 2.0 |
| (A) | Diethylene glycol n-hexyl ether | — | — | — |
| Surfactant (B) | BEAULIGHT (trade name) NA-25S (*2) | 2.0 (0.5) | 2.0 (0.5) | 2.0 (0.5) |
| | EMAL (trade name) 327 (*3) | — | — | — |
| | EMAL (trade name) 0 (*4) | — | — | — |
| | SUNNOL (trade name) LM-1130 (*5) | — | — | — |
| | NEOPELEX (trade name) G-25 (*6) | — | — | — |
| | LIPON (trade name) LH-200 (*7) | — | — | — |
| | FR-15 (*8) | — | — | — |
| | FR-25 (*9) | — | — | — |
| | Active ingredient amount | 0.50 | 0.50 | 0.50 |
| | Water | balance | balance | balance |
| Evaluation | Permeability evaluation | A | C(1) | C(1) |
| | B/A | — | — | — |
| | Solubility evaluation for DEGHE | A | A | A |
| | Water repellence evaluation | S | S | S |
| | Vaporization characteristic evaluation | C | A | A |
| Overall evaluation | | C | C | C |

As shown in Table 1, the inks of Examples 1 to 9 had the good results of the permeability evaluation, the solubility evaluation for DEGHE, and the vaporization characteristic evaluation. The ink of Example 10, in which the surfactant was the polyoxyethylene alkyl ether sulfate and the weight ratio of the surfactant with respect to DEGHE (B/A) was 0.20, had the good results of all of the permeability evaluation, the solubility evaluation for DEGHE, the water repellence evaluation, and the vaporization characteristic evaluation. Further, the inks of Examples 11 to 18, in which the surfactant was the polyoxyethylene alkyl ether sulfate and the weight ratio (B/A) was not less than 0.25, had the good results of the permeability evaluation, the solubility evaluation for DEGHE, and the vaporization characteristic evaluation, wherein the results of the water repellence evaluation were especially excellent.

On the other hand, as shown in Table 2, the inks of Comparative Examples 1 to 4 were inferior in the results of the permeability evaluation and the water repellence evaluation. The ink of Comparative Example 5 was inferior in the result of the permeability evaluation. Since the inks of Comparative Examples 1-5 each contained DEGHE at the amount smaller than that of the examples, it is considered that the content amount (blending amount) of DEGHE in the ink reflects the permeability. In view of the results of the examples, it is considered that the content amount of DEGHE is preferably not less than 1.0% by weight for obtaining sufficient permeability of the ink.

The ink of Comparative Example 6 was inferior in the results of the permeability evaluation (permeability was excessive) and the vaporization characteristic evaluation. Further, the inks of Comparative Examples 7 to 17, in which the weight ratio of the surfactant with respect to DEGHE (B/A) was less than 0.10, had a satisfactory permeability of the ink but were inferior in the results of the solubility evaluation for DEGHE and the water repellence evaluation. Accordingly, it is appreciated that even if an ink contains DEGHE in an amount for obtaining sufficient permeablity, it is necessary that the predetermined surfactant is contained in an amount appropriate with respect to DEGHE for obtaining the satisfactory solubility and water repellence.

Further, the inks of Comparative Examples 18 and 19, in which DEGHE was not contained, were inferior in the results of the vaporization characteristic evaluation since it was attempted to obtain preferable permeability with triethylene glycol n-butyl ether or dipropylene glycol n-propyl ether blended instead of DEGHE. Further, the inks of Comparative Examples 20 and 21, in which DEGHE was not contained, were inferior in the results of the permeability evaluation since it was attempted to obtain preferable vaporization characteristic with triethylene glycol n-butyl ether or dipropylene glycol n-propyl ether blended instead of DEGHE. From these results, it is appreciated that it is not possible to obtain an ink having both the preferable permeability and preferable vaporization characteristic when the penetrant combined with the surfactant is the triethylene glycol n-butyl ether or dipropylene glycol n-propyl ether; and that DEGHE is suitable as the penetrant combined with the surfactant.

As described above, the water base ink for ink jet recording of the present invention is excellent in the permeability and the vaporization characteristic. The way of use of the water base ink for ink jet recording of the present invention is not limited. The water base ink for ink jet recording of the present invention is widely applicable to various types of the ink-jet recording.

What is claimed is:

1. A water base ink for ink jet recording comprising a coloring agent, water, a penetrant, and a surfactant, wherein:
   the penetrant includes 1 to 2.5 wt. % diethylene glycol n-hexyl ether;
   the surfactant includes at least one surfactant selected from the group consisting of alkyl sulfonate, alkylbenzene sulfonate, alkyl carboxylate, and polyoxyethylene alkyl ether sulfate; and
   a weight ratio of the surfactant with respect to the diethylene glycol n-hexyl ether is not less than 0.10, and a line width of a one-dot line, which is obtained when an amount of one liquid droplet of the ink to be discharged is set to be within a range of 22 pL to 28 pL and the one-dot line is printed on a plain paper sheet, is 115 μM to 135 μM.

2. The water base ink for ink jet recording according to claim 1, wherein the surfactant includes the polyoxyethylene alkyl ether sulfate, and a weight ratio of the polyoxyethylene alkyl ether sulfate with respect to the diethylene glycol n-hexyl ether is not less than 0.20.

3. The water base ink for ink jet recording according to claim 2, wherein the weight ratio is not less than 0.25.

4. The water base ink for ink jet recording according to claim 1, wherein the coloring agent is a self-dispersible pigment.

5. An ink cartridge comprising a water base ink for ink jet recording, wherein the ink is the water base ink for ink jet recording as defined in claim 1.

6. The ink cartridge according to claim 5, wherein the ink cartridge is formed of at least one resin selected from the group consisting of polypropylene, polyethylene, acrylonitrile-butadiene-styrene copolymer synthetic resin, acrylonitrile-ethylene-styrene copolymer synthetic resin, and polystyrene.

7. The ink cartridge according to claim 6, wherein the ink cartridge is formed of polypropylene.

8. An ink-jet recording apparatus comprising an ink cartridge and an ink discharge head, and discharging an ink contained in the ink cartridge from the ink discharge head, wherein the ink cartridge is the ink cartridge as defined in claim 5.

9. A water base ink for ink jet recording comprising:
   a coloring agent;
   water;
   diethylene glycol n-hexyl ether; and
   at least one surfactant selected from the group consisting of alkyl sulfonate, alkylbenzene sulfonate, alkyl carboxylate, and polyoxyethylene alkyl ether sulfate;
   wherein the diethylene, glycol n-hexyl ether is contained in the water base ink in an amount of 1.0% by weight to 2.5% by weight;
   a weight ratio of the surfactant with respect to the diethylene glycol n-hexyl ether is not less than 0.10.

10. The water base ink for ink jet recording according to claim 9, wherein the surfactant is the polyoxyethylene alkyl ether sulfate; and the weight ratio is not less than 0.20.

11. The water base ink for ink jet recording according to claim 10, wherein the weight ratio is not less than 0.25.

12. The water base ink for ink jet recording according to claim 9, wherein the coloring agent is a self-dispersible pigment.

13. An ink cartridge comprising a water base ink for ink-jet recording, wherein the ink is the water base ink for ink-jet recording as defined in claim 9.

14. The ink cartridge according to claim 13, wherein the ink cartridge is formed of at least one resin selected from the group consisting of polypropylene, polyethylene, acrylonitrile-butadiene-styrene copolymer synthetic resin, acrylonitrile-ethylene-styrene copolymer synthetic resin, and polystyrene.

15. The ink cartridge according to claim 14, wherein the ink cartridge is formed of the polypropylene.

16. An ink-jet recording apparatus comprising an ink cartridge and an ink discharge head, and discharging an ink contained in the ink cartridge from the ink discharge head, wherein the ink cartridge is the ink cartridge as defined in claim 13.

17. The water base ink for ink-jet recording according to claim 1, wherein the at least one surfactant is sodium polyoxyethylene (2.5 E.O) lauryl ether sulfate.

18. The water base ink for ink jet recording according to claim 9, wherein the at least one surfactant is sodium polyoxyethylene (2.5 E.O.) lauryl ether sulfate.

* * * * *